United States Patent
Cohen et al.

(10) Patent No.: US 11,410,165 B1
(45) Date of Patent: Aug. 9, 2022

(54) SYSTEMS AND METHODS FOR PROVIDING QUEUED CREDENTIALS FOR AN ACCOUNT

(71) Applicant: Wells Fargo Bank, N.A., San Francisco, CA (US)

(72) Inventors: Gerard K. Cohen, Oakland, CA (US); Michelle D. Green, San Francisco, CA (US); Christopher P. Smith, Marvin, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1572 days.

(21) Appl. No.: 14/965,135

(22) Filed: Dec. 10, 2015

(51) Int. Cl.
*G06Q 40/00* (2012.01)
*G06F 21/46* (2013.01)
*G06Q 20/38* (2012.01)

(52) U.S. Cl.
CPC ......... *G06Q 20/3821* (2013.01); *G06F 21/46* (2013.01); *G06Q 40/00* (2013.01)

(58) Field of Classification Search
CPC ................................................ G06Q 20/3821
See application file for complete search history.

(56) References Cited

U.S. PATENT DOCUMENTS

| | | | |
|---|---|---|---|
| 5,745,555 A * | 4/1998 | Mark | H04M 17/00 379/361 |
| 6,422,462 B1 * | 7/2002 | Cohen | G06Q 20/105 235/380 |
| 7,093,282 B2 | 8/2006 | Hillhouse | |
| 7,669,057 B2 | 2/2010 | Kelley et al. | |
| 8,041,954 B2 | 10/2011 | Plesman | |
| 8,266,441 B2 | 9/2012 | Inskeep et al. | |
| 8,731,197 B2 | 5/2014 | Nahari | |
| 8,756,652 B2 | 6/2014 | Jakobsson | |

(Continued)

FOREIGN PATENT DOCUMENTS

| | | |
|---|---|---|
| CA | 2627108 | 10/2009 |
| CN | 102129740 | 7/2011 |

(Continued)

OTHER PUBLICATIONS

D. Gustafson, M. Just, M. Nystrom, Securely Available Credentials (SACRED)—Credential Server Framework (RFC3760), Apr. 1, 2004, The Internet Society (2004), pp. 12-16 (Year: 2004).*

(Continued)

*Primary Examiner* — Mamon Obeid
*Assistant Examiner* — Zehra Raza
(74) *Attorney, Agent, or Firm* — Foley & Lardner LLP

(57) ABSTRACT

Systems, methods, and apparatuses for changing credentials for an account, or a card associated with an account are provided. A method of changing user credentials by creating a queue of credentials for facilitating access to at least one account of a user, where each credential in the queue of credentials is randomly and automatically generated using information provided by the user without additional input from the user; detecting a deactivation event relating to an account of the at least one account of the user; responsive to the detected deactivation event, deactivating a current credential for the account; and activating a new credential to facilitate access to the account, where the new credential is next in the queue of credentials.

12 Claims, 6 Drawing Sheets

(56) References Cited

U.S. PATENT DOCUMENTS

| | | | |
|---|---|---|---|
| 8,775,807 B1* | 7/2014 | Vazquez | G06F 21/31 |
| | | | 713/168 |
| 8,869,303 B2 | 10/2014 | Fleysher | |
| 8,875,261 B2 | 10/2014 | Delia et al. | |
| 8,885,833 B2 | 11/2014 | Nick et al. | |
| 8,898,749 B2 | 11/2014 | Tohmo et al. | |
| 8,919,643 B2 | 12/2014 | Ashfield | |
| 8,949,616 B2 | 2/2015 | Hird et al. | |
| 8,955,065 B2* | 2/2015 | Hitchcock | G06F 21/41 |
| | | | 726/5 |
| 8,984,599 B2 | 3/2015 | Bodavula | |
| 2002/0178124 A1 | 11/2002 | Lewis | |
| 2002/0198834 A1* | 12/2002 | Kramer | G06Q 30/0601 |
| | | | 705/40 |
| 2003/0131096 A1* | 7/2003 | Goringe | H04L 63/08 |
| | | | 709/224 |
| 2007/0057039 A1* | 3/2007 | Carlson | G06Q 20/40 |
| | | | 235/380 |
| 2007/0241183 A1 | 10/2007 | Brown et al. | |
| 2012/0078795 A1* | 3/2012 | Mann, III | G06Q 20/383 |
| | | | 705/44 |
| 2013/0111571 A1 | 5/2013 | Jakobsson | |
| 2013/0276101 A1 | 10/2013 | Rautenbach et al. | |
| 2014/0089196 A1 | 3/2014 | Paya et al. | |
| 2015/0003607 A1 | 1/2015 | Choi et al. | |
| 2015/0007286 A1 | 1/2015 | Stone | |
| 2015/0046993 A1 | 2/2015 | Arceo | |
| 2015/0200925 A1* | 7/2015 | Lagerstedt | H04L 63/062 |
| | | | 726/6 |

FOREIGN PATENT DOCUMENTS

| | | |
|---|---|---|
| WO | WO-2013/061171 | 5/2013 |
| WO | WO-2014/032001 | 2/2014 |
| WO | WO-2014/086717 | 6/2014 |

OTHER PUBLICATIONS

Kim, et al., A Design of One-Time Password Mechanism using Public Key Infrastructure, Fourth International Conference on Networked Computing and Advanced Information Management, 2008, NCM '08, vol. 1, IEEE, 7 pages.

M'Raihi, et al., HOTP: An HMAC-Based One-Time Password Algorithm, The Internet Society, Network Working Group, RFC4226, Dec. 2005, Retrieved from the internet at http://www.hjp.at/doc/rfc/rfc4226.html on Dec. 12, 2005, 38 pages as printed.

Rubin, A., Independent One-Time Passwords, Computing Systems, vol. 9, No. 1, Winter 1996, Bellcore, 13 pages.

\* cited by examiner

SYSTEMS AND METHODS FOR PROVIDING QUEUED CREDENTIALS FOR AN ACCOUNT

TECHNICAL FIELD

Embodiments of the present disclosure relate to changing credentials associated with an account.

BACKGROUND

Today, people have various types of accounts such as financial accounts. With the advent of the Internet and networking capabilities, individuals began having the option to manage their accounts online. Typically, the accounts are secured by one or more credentials. When a credential or the account in general has been compromised (e.g., lost, stolen, etc.), the user may still need access to the account. While each account may have a different protocol when an account is compromised, the individual may not be in a situation where they can provide the appropriate information to regain access to the account. Such a situation may be inconvenient and frustrating to the user.

SUMMARY

A first embodiment of the disclosure relates to a method of changing user credentials. The method may include creating a queue of credentials for facilitating access to at least one account of a user, wherein each credential in the queue of credentials is randomly and automatically generated using information provided by the user without additional input from the user. The method may further include detecting a deactivation event relating to an account of the at least one account of the user and responsive to the detected deactivation event, deactivating a current credential for the account. The method may include activating a new credential to facilitate access to the account, wherein the new credential is next in the queue of credentials.

In some embodiments, the method includes alerting the user of a change in credentials, wherein the alert includes a stimulus of the new credential, wherein the user will know the new credential based on the stimulus. In another embodiment, the method includes causing to create a new account card for the account. In some embodiments, the new card created is at least one of a temporary card or transaction number, a card ordered from an account associated with the card, and a card printed using an on demand card printer. In yet another embodiment, the method includes detecting a second deactivation event for the account, responsive to the second deactivation event, deactivating the new credential for the account; and generating a plurality of security questions. The method may include receiving, from the user, answers to the security questions and selectively reactivating the account based on the answers to the security questions. In some embodiments, the security questions are based on knowledge obtained from a user device associated with the account. In some embodiments, the knowledge is indicative of activity of the user. In another embodiment, the method includes treating a credit card like a debit card, and the credit card automatically receives a personal identification number and is associated with the same financial account as the credit card. In some embodiments, the deactivation event is caused by at least one of a failed transaction, an expiration of a predetermined amount of time and a determined geographical location of a transaction or a user. In another embodiment, the geographic location is associated with a customized queued credential, and the customized queued credential can only be used within the geographic location.

Another embodiment of the present disclosure relates to an apparatus. The apparatus may include a credentials circuit structured to generate and queue credentials for facilitating access to at least one account of a user, where each credential in the queue of credentials is randomly and automatically generated using information provided by the user without additional input from the user. The apparatus may also include a detection circuit structured to detect deactivation events relating to the account via at least one detective device implemented on a mobile device of the user. The apparatus may further include an activation/deactivation circuit communicably and operatively coupled to each of the credential circuit and the detection circuit, where the activation/deactivation circuit receives information indicative of the deactivation event and in response the activation/deactivation circuit is structured to deactivate a current credential for the account and activate a new credential, where the new credential is next in the queue of credentials. In some embodiments, the deactivation event is caused by at least one of a failed transaction and an expiration of a predetermined amount of time. In another embodiment, the apparatus may include a location circuit, where the location circuit causes a deactivation event based on a determined geographical location of a transaction and the user. In some embodiments, the location circuit is further structured to customize the queued credentials to only allow a customized credential to be used within the determined geographical location. In another embodiment, the apparatus includes a security circuit, where the security circuit generates a plurality of security questions if the detection circuit detects two or more deactivation events. In yet another embodiment, the apparatus further includes a card management circuit, where the card management circuit creates or causes to create at least one of a new or temporary card number, an order for a new card from an account associated with the card and a new card printed using an on demand card printer. In some embodiments, the card management circuit is further structured to convert a credit card to a debit card, where the debit card automatically receives a personal identification number and is associated with the account.

Yet another embodiment of the present disclosure is a device including a network interface configured to communicate with an account system via a network and at least one processor. The at least one processor may be structured to create a queue of credentials for facilitating access to at least one account of a user, where each credential in the queue of credentials is randomly and automatically generated using information provided by the user without additional input from the user, detect a deactivation event relating to the account, responsive to the deactivation event, deactivate a current credential for the account and activate a new credential to facilitate access to the account, where the new credential is next in the queue of credentials. In some embodiments, the processor is further structured to alert the user of a change in credentials, where the alert includes a stimulus of the new credentials, where the user will know the new credential based on the stimulus. In another embodiment, the processor is further structured to initiate the creation of a new card for the account. In some embodiments, the new card created is at least one of a temporary card or transaction number, a card ordered from an account associated with the card, and a card printed using an on demand card printer. In yet another embodiment, the processor is further structured to detect a second deactivation event for the financial account, generate a plurality of security questions, receive, from the user, answers to the security questions, and selectively reactivate the account based on the answers to the security questions. In some embodiments, the security questions are based on knowledge obtained from a user device associated with the account.

In some embodiments, the processor is further structured to convert a credit card to a debit card, where the debit card automatically receives a personal identification number and is associated with the account. In another embodiment, the deactivation event is caused by at least one of a failed transaction, an expiration of a predetermined amount of time and a determined geographical location of a transaction and a user. In yet another embodiment, the processor is further structured to determine if a geographic location is associated with a customized queued credential, where the customized queued credential can only be used within the geographic location.

These and other features, together with the organization and manner of operation thereof, will become apparent from the following detailed description when taken in conjunction with the accompanying drawings.

DETAILED DESCRIPTION

Referring to the Figures generally, systems, methods, and apparatuses for changing credentials for an account (e.g., financial account, frequent flier mile account, research website account, gym membership, etc.) via a queue of credentials are described herein. According to the present disclosure, a queue of credentials may be implemented with at least one user device (e.g., a mobile device, a smart watch, etc.). The system or apparatus for implementing the queue of credentials for an account may be structured to detect an account-related event (e.g., fraudulent activity, failed transaction) and in response, deactivate a credential associated with the account, alert a user of a change in credentials, activate a new credential, and manage various items associated with the account. As an example, the account may be a mobile wallet account and the deactivation event may be an out-of-pattern usage associated with the account, potentially (but not for certain) resulting from a lost or stolen mobile device. The out-of-pattern usage may be based on the mobile wallet being used for a certain amount of time outside of the home state of the user or other unusual activity. In response, the system and apparatus of the present disclosure may deactivate a credential (e.g., login credentials, personal identification number (PIN), etc.) associated with the mobile wallet. The system and apparatus may then generate and activate a new credential and alert the owner of this change.

Figure 1:
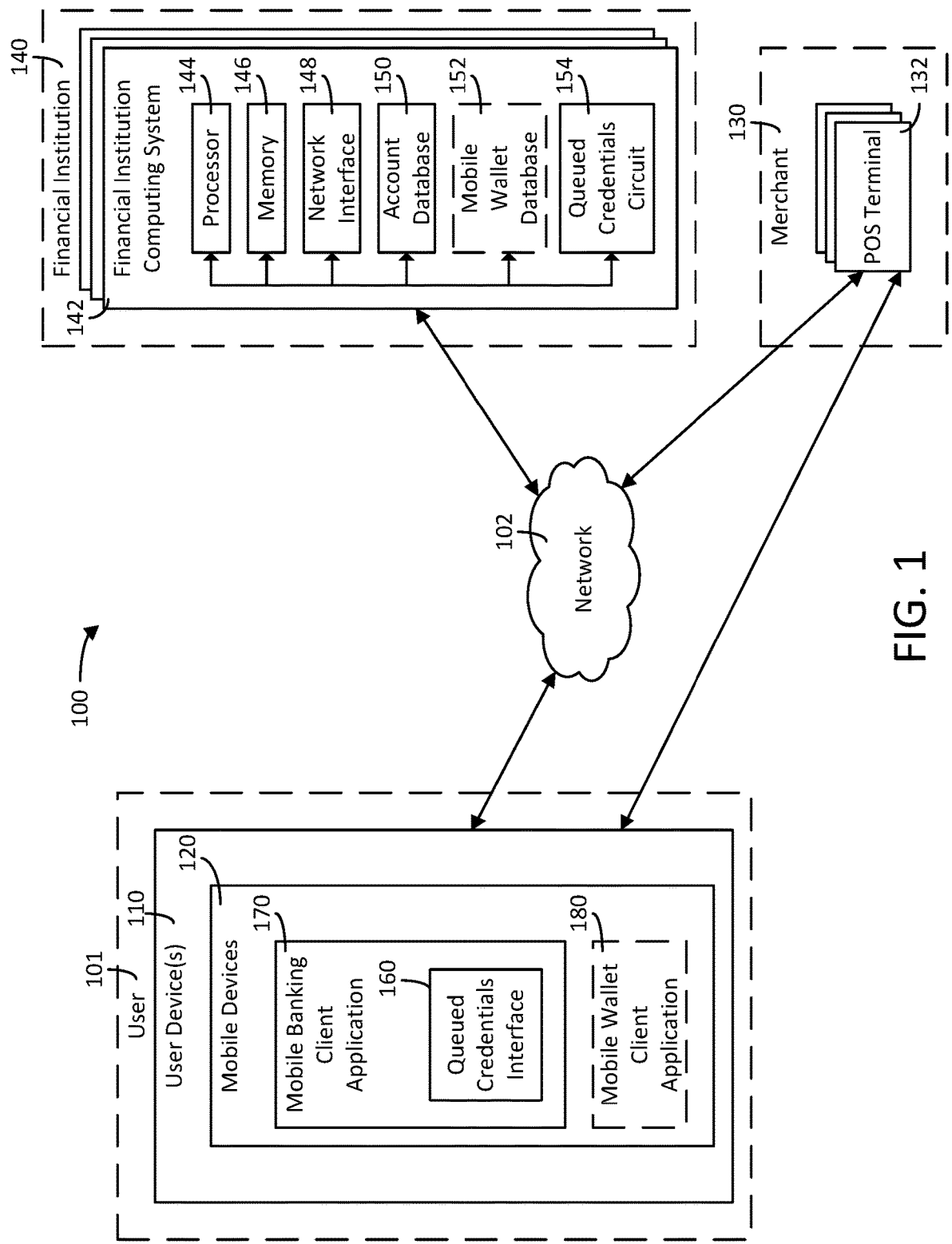
FIG. 1 is a diagram of a computing system, according to an example embodiment.

Referring now to FIG. 1, a block diagram of a computing system 100 is shown according to an example embodiment. Computing system 100 may include a user device 110 of or associated with a user 101, a merchant 130, a financial institution 140, and a network 102. It should be understood that while FIG. 1 and the accompanying disclosure is primarily described in regard to one or more financial accounts of the user, such disclosure is for illustrative purposes only. In other embodiments, the one or more accounts may include any other type of account where login credentials are required. For example, the "account" may include, but is not limited to, an account(s) with social media websites, a frequent flyer mile account, a website account such as a genealogical website, a gym membership account, an account with online merchant websites, an account with news media websites, an account with other online services, and so on. In this regard, the computing system 100 may be any type of computing system (e.g., any type of computing architecture) for holding and managing those accounts of the user, such that the "financial institution 140" is not meant to be limiting as other institutions and entities may manage, be a part of, or otherwise be associated with an account of the user As described herein, the computing system 100 facilitates access and management of the accounts (e.g., credit card, debit card, etc.) of the user 101.

As shown, the financial institution 140 includes a financial institution computing system 142. The financial institution computing system 142 may be operated or held by the financial institution 140. While only one financial institution 140 is depicted in FIG. 1, in other embodiments, more than one financial institution 140 may be included with the computing system 100 to provide a relatively greater and holistic tracking and management capability for each of the accounts at each of the financial institutions of the user 101. The financial institution computing system 142 includes a processor 144, one or more memory devices 146, a network interface 148, an account database 150, a mobile wallet database 152, and a queued credentials circuit 154. The processor 144 may be implemented as a general-purpose processor, an application specific integrated circuit (ASIC), a digital signal processor (DSP), a group of processing components that may be distributed over a geographic region, or other suitable electronic processing components. The one or more memory devices 146 (e.g., RAM, ROM, NVRAM, Flash Memory, hard disk storage, etc.) may store data and/or computer code for facilitating at least some of the various processes described herein. In this regard, the memory 146 may store programming circuits that, when executed by the processor 144, control the operation of the financial institution computing system 142.

The financial institution computing system 142 is shown to include a network interface 148. The network interface 148 may facilitate the sending and receiving of data, commands, instructions, values, etc. over the network 102 (e.g., to and from the merchant point-of-sale (POS) terminal 132, to and from the user device 110, etc.).

The financial institution computing system 142 also includes an account database 150 that stores customer information and account information relating to accounts held by the user 101 of the financial institution 140. In this regard and as mentioned above, more than one financial institution 140 with an associated financial institution computing system 142 may be communicably coupled to the components of FIG. 1 over the network 102 to accommodate several accounts held by the user 101 by two or more financial institutions.

As shown, the financial institution computing system 142 may also include a mobile wallet account database 152 for storing mobile wallet accounts and information pertaining thereto of users. As described herein below, the mobile wallet accounts may permit payments via the mobile wallet client application 180.

The financial institution computing system 142 may also include a queued credentials circuit 154 for storing one or more queues of credentials for accounts of users. As described more fully herein, the queue of credentials for accounts may allow users to access compromised accounts via the queued credentials interface 160.

The merchant 130 may include any type of merchant who may be a party to a transaction, such as a financial transaction. Thus, the merchant 130 may include a physical store (e.g., restaurant, entertainment store such as a movie theater, grocery store, hardware store, pub/bar, mall location, gas or fueling station, etc.), an individual selling items (e.g., off of a street, etc.), an online merchant, and so on. The merchant 130 is also shown to include a point of sale (POS) terminal 132. A financial transaction refers to the receiving and/or providing of currency and can be via any one of a number of different financial exchange protocols, such as credit cards, debit cards, checks, math-based currency, physical cash, etc. In this regard, the financial transaction may occur over the network 102 (e.g., as an online sale, etc.) and/or in a physical location (e.g., a brick and mortar location). Accordingly, the POS terminal 132 may include any type of point-of-sale terminal. For example, for online purchases, the POS terminal 132 may include a website or an application that processes and facilitates a financial transaction. In another example, for a physical location, the POS terminal 132 may include a cash register and/or a card reader (e.g., a credit/debit card scanner, etc.).

The user 101 may be a customer or party to the transaction (e.g., financial transaction) with the merchant 130. As used herein, the term "transaction" is meant to be broadly defined and interpreted. For example, in one instance, the transaction may refer to a financial transaction. In another example, the transaction may refer to a non-financial transaction, such as simply the logging on or accessing of a website portal. Accordingly, the term "transaction" may refer to any operation or interaction executed by the user in an account associated with the user (e.g., login event, profile edits, making a flight reservation using frequent flier miles, financial transactions, accessing and viewing a Treasury Information Reporting report, etc.). Accordingly, the user 101 may include individuals, business representatives, large and small business owners, administrator(s), other entities, and so on. According to one embodiment, the user 101 may have a financial account at one or more of the financial institutions 140 of the system 100.

As shown, the user 101 may also have or be associated with a user device 110. The user device 110 may be generally described as a mobile device 120. However, the user device 110 may also include any computing device of the user (e.g., home computer, etc.). The mobile device 120 may include any wearable device of the user 101. Wearable devices refer to any type of device that a user 101 wears including, but not limited to, a watch (e.g., a smart watch), glasses (e.g., eye glasses, sun glasses, smart glasses, etc.), bracelet (e.g., a smart bracelet), etc. Mobile devices 120 may also include any type of mobile device of a user 101 including, but not limited to, a phone (e.g., smartphone, etc.) and a computing device (e.g., tablet computer, laptop computer, person digital assistant, etc.).

As shown, the user device 110 may include a mobile banking client application 170 having a queued credentials interface 160, and a mobile wallet client application 180. In one embodiment, the user 101 may have to first download the application(s) prior to their usage. In another embodiment, the mobile banking client application 170, and mobile wallet client application 180 may be hard coded into the memory of the user device 110. In still another embodiment, the mobile banking client application 170 and mobile wallet client application 180 may be web-based interface applications such that the mobile device 120 may provide a thin client (web browser) interface to applications 170 and 180, which may be executed and maintained remotely. In this instance, the user 101 may have to log onto or access the web-based interface before usage of the application(s). Further, and in this regard, at least one of the mobile banking client application 170 and the mobile wallet client application 180 may be supported by a separate computing system comprising one or more servers, processors, network interface circuits, etc. that transmit the applications for use to the user device 110. In certain embodiments, the mobile banking client application 170 and/or mobile wallet client application 180 may include an application programming interface (API) and/or a software development kit (SDK) that facilitate the integration of other applications with at least one of the mobile banking client application 170 and mobile wallet client application 180. In another embodiment, the mobile banking client application 170 and the mobile wallet client application 180 could be provided as a single application. In another embodiment, the queued credentials client application 160 could be provided as a standalone application. In additional embodiments, the mobile wallet application 180 could be provided without the mobile banking client application 170 (e.g., a mobile wallet proved by an entity that is not a financial institution). All such variations and combinations are intended to fall within the spirit and scope of the present disclosure.

The mobile wallet client application 180 may be communicably coupled to the financial institution computing system 142 (e.g., the mobile wallets database 152) via the network 102 and is structured to facilitate purchases by the user 101 via the mobile wallet client application 180. Accordingly, the mobile wallet client application 180 may be linked or otherwise connected with one or more accounts of the user 101. In operation, when at a POS terminal 132, a user 101 may open the mobile wallet client application 180 and provide a passcode (e.g., biometrics such as a thumbprint, a personal identification number (PIN), a password, etc.) to authenticate the person and select the payment account desired (e.g., a checking account from a particular financial institution that is linked to the mobile wallet client application 180). Via communication with the payment terminal (e.g., near field communication), the aforementioned payment information is provided and the payment is processed. Beneficially, carrying payment cards may be avoided or reduced via the mobile wallet client application 180.

The mobile banking client application 170 may be communicably coupled to the financial computing system 142 (e.g., the accounts database 152) via the network 102 and structured to permit management of the user's accounts via the mobile banking client application 170. In this regard, the mobile banking client application 170 may provide displays indicative of current account balances, pending transactions, profile information (e.g., contact information), and the like.

Further, in some embodiments, the mobile banking client application 170 may also permit payments from the user 101 to a designated recipient. For example, the mobile banking client application 170 may depict a loan of a user (e.g., mortgage) and allow the user 101 to pay the loan from one of their accounts (e.g., checking or savings). In another example, a bill pay option may be provided by the mobile banking client application 170, where the bill pay option allows the user 101 to pay his/her bills.

As shown, the financial computing system 142 includes a queued credentials circuit 154 communicably and operatively coupled to the accounts database 150 and mobile wallet database 152. The queued credentials circuit 154 may be structured to generate a queue of credentials, detect a deactivation event, deactivate the current credential for an account, and activate a new credential for the account to facilitate/permit a user to regain access to a compromised account. As shown, the mobile device 120 includes a queued credentials interface 160 embodied in the mobile banking client application 170. This is for illustrative purposes only; in other instances, the queued credentials interface 160 may be embodied as a separate application on the mobile device 120 or embodied/included with a different application running on the mobile device 120, such as mobile wallet client application 180. The queued credentials interface 160 may be structured to allow users to communicate with the queued credentials circuit 154. For example, the queued credentials interface 160 may be structured as a user interface that permits the user to provide information that is communicated to the queued credentials circuit 154 (e.g., answers to security questions, etc.). Accordingly, the queued credentials interface 154 may be structured as a thin-client application that facilitates the exchange of information, data, values, and the like between the mobile device 120 and the queued credentials circuit 154. In this regard, the user may be required to provide one or more credentials to communicate with the queued credentials circuit 154. Beneficially, if the mobile device 120 is compromised (e.g., lost, stolen, etc.), information stored/maintained by the queued credentials circuit 154 may be prevented from access due to such information not being stored in the memory of the mobile device 120. The structure and function of the queued credentials interface 160 and the queued credentials circuit 154 may be more fully explained in regard to FIGS. 2A and 2B.

Figure 2A:
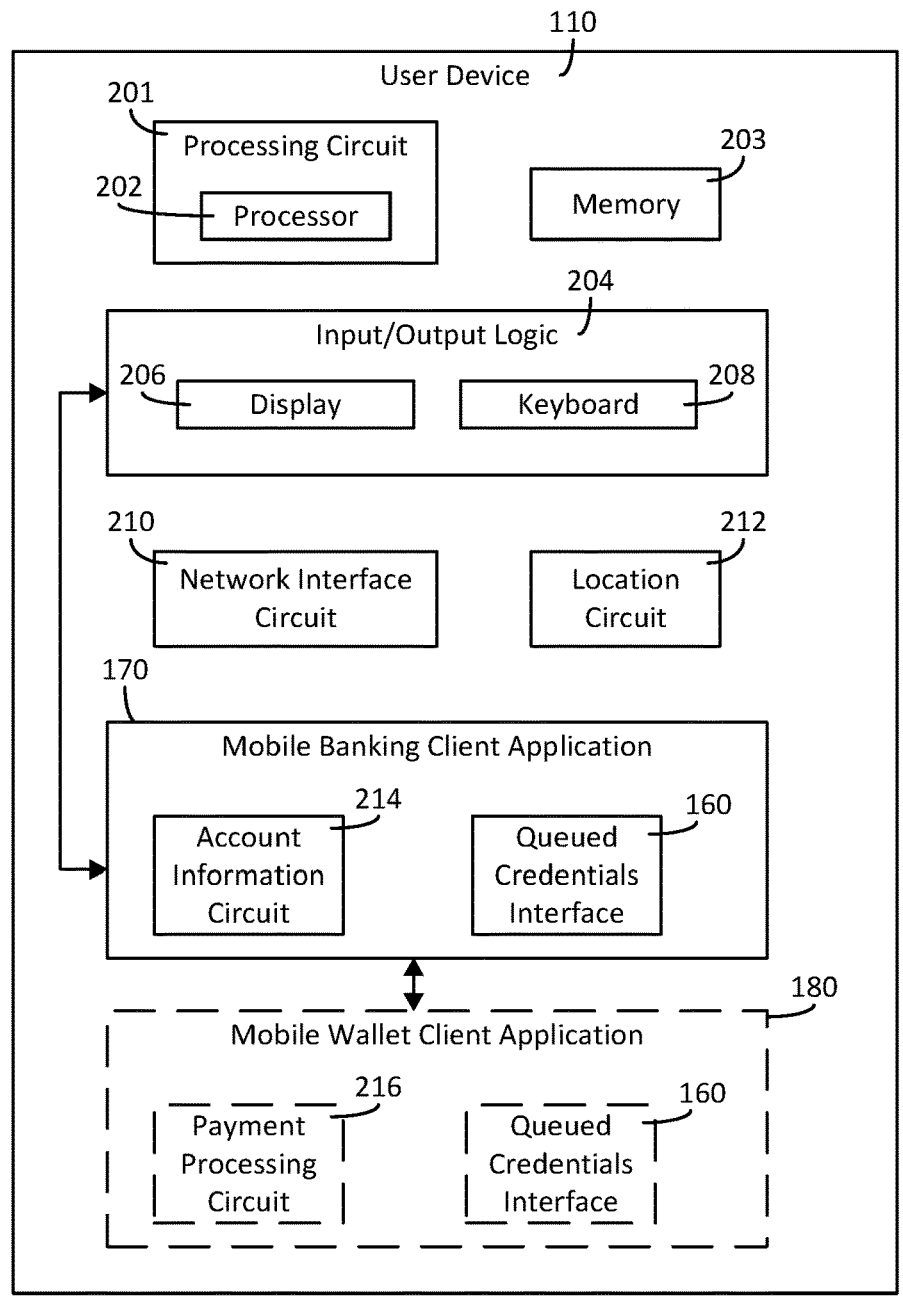
FIG. 2A is a diagram of the user device of FIG. 1, according to an example embodiment.

Accordingly, referring now to FIG. 2A, the function and structure of the user device 110 with the mobile banking client application 170, queued credentials interface 160, and the mobile wallet client application 180 are shown in greater detail according to an example embodiment. As shown in FIG. 2, the user device 110 may include a processing circuit 201, having a processor 202, one or more memory devices 203, an input/output logic 204, a network interface circuit 210, and a location circuit 212. The processor 202 may be implemented as a general-purpose processor, an application specific integrated circuit (ASIC), a digital signal processor (DSP), a group of processing components that may be housed in a single location, or other suitable electronic processing components. The one or more memory devices 203 (e.g., RAM, NVRAM, ROM, Flash Memory, hard disk storage, etc.) may store data and/or computer code for facilitating the various processes described herein. Moreover, the one or more memory devices 203 may be or include tangible, non-transient volatile memory or non-volatile memory. Accordingly, the one or more memory devices 203 may include database components, object code components, script components, or any other type of information structure for supporting the various activities and information structures described herein.

The user device 110 is shown to include various circuits for completing at least some of the activities described herein. More particularly, the user device 110 includes input/output logic 204, a network interface circuit 210, a location circuit 212, a mobile wallet client application circuit 180, and a mobile banking client application 170 having a queued credentials interface 160. While various circuits with particular functionality are shown in FIG. 2, it should be understood that the user device 110 may include any number of circuits for completing the functions described herein. For example, the activities of multiple circuits may be combined as a single circuit, as additional circuits with additional functionality may be included, etc.

The input/output logic 204 may be structured to receive and provide communication(s) to a user 101 of the device 110 (or, to another entity such as the POS terminal to facilitate mobile wallet payments). The input/output logic 204 may also be structured to exchange data, communications, instructions, etc. with an input/output component of the device 110. Thus, the input/output logic 204 may include one or more circuits for communicating with the input/output devices of the user device 110. As shown, the input/output logic 204 includes a keyboard circuit 208, and a display circuit 206. In one embodiment, the keyboard circuit 208 includes a keyboard of the mobile device 110. Similarly, in one embodiment, the display circuit 206 includes a screen of the device 110 (e.g., a touch screen, a display screen, etc.). In other embodiments, the keyboard circuit 208 and the display circuit 206 include communication circuitry, machine-readable media, and/or any combination therewith for facilitating the exchange of information, data, values, and the like between the user and the queued credentials interface 160. As described herein below, the queued credentials interface 160 may utilize one or more of these circuits to extract or provide details regarding the account.

The network interface circuit 210 is adapted for and configured to establish a communication session via the network 102 with at least one of the financial computing system 142 and the merchant 130 (e.g., via the POS terminal 132). Accordingly, the network interface circuit 210 includes any of a cellular transceiver (e.g., CDMA, GSM, LTE, etc.), a wireless network transceiver (e.g., 802.11X, ZigBee, Bluetooth, etc.), or a combination thereof (e.g., both a cellular transceiver and a Bluetooth transceiver). Further, the network interface circuit 210 may include cryptography capabilities to establish a secure or relatively secure communication session with the at least one financial computing system 142 or another device of the user's choosing. In this regard, financial data (or other types of data) may be encrypted and transmitted to prevent or substantially prevent the threat of hacking.

The location circuit 212 may be structured to receive location data and determine a location of the user device 110 based on the location data. In one embodiment, the location circuit 212 may include a global positioning system (GPS) or any other type of location positioning system. As such, the location circuit 212 may receive latitude data, longitude data, and any other type of location or position data to determine the location of the user device 110. In another embodiment, the location circuit 212 may receive information indicative of the location of the user device 110 (e.g., from a satellite included with the GPS system). In other embodiments, the location circuit 212 may receive location data from the merchant POS terminal 132 that indicates the location of the user device 110. In still other embodiments, the location circuit 212 may receive an explicit location identification from the user 101 of the device 110. All such variations are intended to fall within the spirit and scope of the present disclosure.

As mentioned above, via the mobile banking client application 170, the user 101 may deposit checks, pay bills (e.g., mortgage, etc.), and otherwise manage their account (e.g., check the balance, etc.). Accordingly and as shown, the mobile bank client application 170 may include an account information circuit 214. The account information circuit 214 may be linked or otherwise coupled to one or more accounts held by a user 101 and permit management of the associated account (e.g., transfer balances between accounts, see payment history, etc.).

In addition to the above, the mobile banking client application 170 may allow user 101 to access and manage their credentials via the queued credentials interface 160. As mentioned above, the queued credentials interface 160 may be structured to communicate with the queued credentials circuit 154. Communications between the queued credentials interface 160 and the queued credentials circuit 154 may be facilitated by the network interface circuit 210.

As mentioned above, the mobile wallet client application 180 may be structured to facilitate and permit payments by interfacing with an account (e.g., a credit card account, a checking account, etc.) held by the user 101 at a financial institution 140. Accordingly, the mobile wallet client application 180 may be communicably coupled via the network interface circuit 210 over the network 102 to the financial institution computing system 142. As shown, the mobile wallet client application 180 may include a payment processing circuit 216 structured to facilitate payments by a user 101 via the mobile wallet client application 180. For example, the payment processing circuit 216 may enable a quick-pay capability to a merchant. In this regard, the payment processing circuit 216 may include or be communicably coupled with a communication device (e.g., via a near-field communication chip) that facilitates the exchange of information between the mobile wallet client application 180 and the POS terminal 132.

Figure 2B:
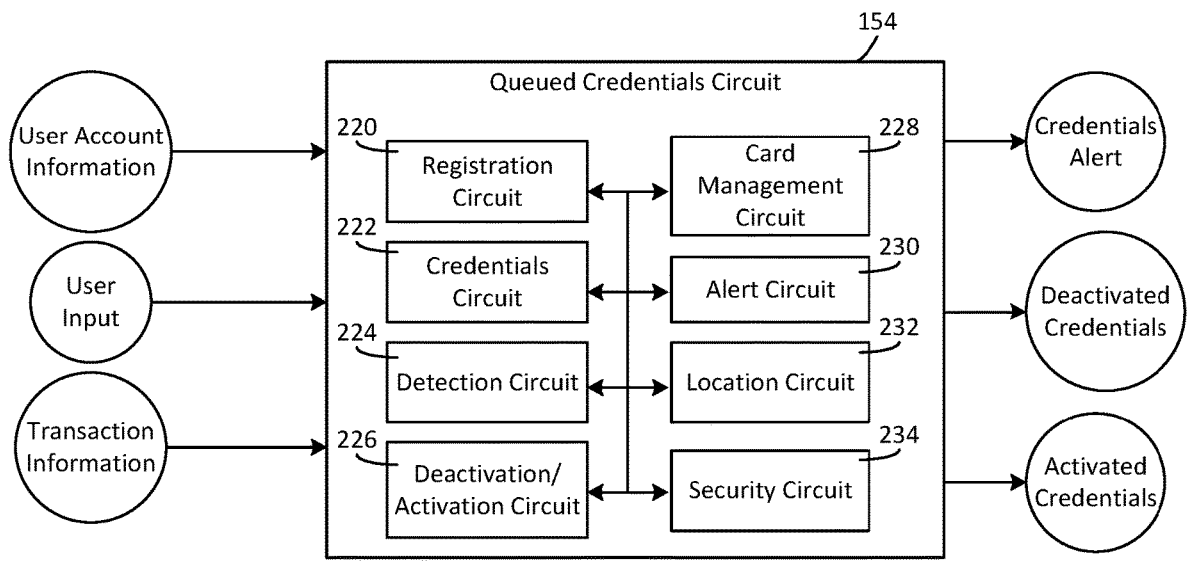
FIG. 2B is a diagram of the financial institution computing system of FIG. 1, according to an example embodiment.

With the above in mind, an example structure for the queued credentials circuit 154 is shown in FIG. 2B. As shown, the queued credentials circuit 154 is embodied in the financial computing system 142, such that the queued credentials circuit 154 may be communicably and operatively coupled to one or more components of the financial computing system 142 (e.g., account database 150). The queued credentials circuit 154 is shown to include a registration circuit 220, a credentials circuit 222, a detection circuit 224, a deactivation/activation circuit 226, a card management circuit 228, an alert circuit 230, a location circuit 232, and a security circuit 234, with all such circuits communicably coupled with to each another. Other embodiments may include more or less circuits without departing from the spirit and scope of the present disclosure. The queued credential circuit 154 may be structured to receive detected financial transactions that may cause a financial account to be deactivated, with little to no input by the user 101 and automatically or substantially automatically change or facilitate changing of one or more credentials and/or cards associated with financial accounts of user 101. Details of the transactions may be captured by the financial institution computing system 142. This may prompt the queued credentials circuit 154 to receive a flagged transaction that may be deemed as fraudulent, and control access (e.g., deactivate an associated credential to prevent access) to the associated the account. Accordingly, the queued credential circuit 154 may be structured to detect and change the credentials for an account based on an established and generated queue of credentials, where such actions may be performed with little to no input from the user 101. As described more fully herein below, the circuits may provide the user with the option to make changes to their profile, add or remove accounts, change alert preferences, change or add credentials questions and answers, modify card management settings, etc. at any time after registration. Beneficially, by requiring no to little input from the user, the user may regain account access quickly, easily, and conveniently even in the event of potentially fraudulent activity with respect to the account.

The registration circuit 220 may be structured to facilitate user registration with the queued credentials circuit 154. The user may register with the queued credentials circuit 154 via the queued credentials interface 160. Registration may include designation of one or more system preferences regarding the queued credential circuit 154. The system preferences may include a security preference, a usage preference, and so on. The user may set preferences individually (e.g., for individual use) or for a plurality of users. For example, an administrator for a company may create preferences and rules for everyone associated with an account of the company. The security preference may define the requirements needed before accessing the queued credentials circuit 154 via the queued credentials interface 160. For example, a user 101 may have to provide a password (e.g., word, phrase, alphanumeric value, biometric scan, etc.) before the queued credentials circuit 154 is accessible (e.g, in embodiments where the queued credentials circuit 154 is provided as a standalone application and is not accessed via another application such as a mobile banking application or a mobile wallet application). The system preference may also include an alert preference. The alert preference may allow the user 101 to determine when (e.g., deactivation event detected, credential change, etc.) and how (e.g., text message, email, notification, etc.) alerts are generated and delivered. Registration may also include a credentials set up. In some embodiments, a credentials set up may include answering a variety of pre-set questions relating to personal information (e.g., mother's maiden name, birthday, first pet, elementary school, etc.). In another embodiment, the user 101 may create their own questions/categories and provide accompanying answers. In yet another embodiment, the user 101 may answer a combination of pre-set and user generated questions. In some embodiments, the user 101 must answer a certain number of questions (e.g., three, four, two, etc.). The questions may be answered with a word, phrase, number, or a combination thereof. The user may also set card management preferences via the registration circuit 220. For example, the user may select what actions are taken (e.g., order new card, use temporary number until new card arrives, 3D print new card, only change credentials, etc.) when a deactivation event is detected. Thus, the system preferences may largely define operation of the queued credential circuit 154 and can be highly configurable from application-to-application.

The credentials circuit 222 may be structured to generate a credential for one or more accounts (e.g., financial account). As used herein, "credentials" as applied to the operations of the credentials circuit 222 refers to one or more security elements a user may be required to enter to gain access to an account, where access is defined as any type of action that allows a user to view, edit, and/or otherwise manage the associated account (e.g., via a web portal to access online banking, etc.). In one embodiment, the credentials circuit 222 may also generate credentials for one or more cards, physical or virtual, associated with the account (e.g., a security code for a credit card, a PIN for a debit card, etc.).

The generated credentials may be a listing of passwords. In some embodiments, the credentials are generated using a random character generator. According to one embodiment, the credentials are generated by a random generator using user defined answers and information obtained from, e.g., the registration circuit 220. In this regard, a user may not actually choose or define the credential. Rather, the credential may be generated by information provided by and specific to the user. For example, the user may define their ideal profession as a "golfer," their favorite color as "blue," and their favorite number as "27." In response, a new password generated based on the user-supplied information may be "golferblue27." As described herein, a stimulus may be provided to the user (e.g., via alert circuit) that provides an indication of the new credential (e.g., "Your credential has changed. Your credential is now [your ideal profession] [your favorite color][your favorite number](no spaces)"). The new password may thus be a pseudo-random combination of information previously provided by the user. As used herein, a "stimulus" refers to any prompt that may be provided to the user to remind the user of information previously provided by the user, and thereby facilitate the user's identification of the new credential. Beneficially, such an action avoids transmission of the actual credential to provide an enhanced level of security. In some embodiments, the credentials are generated by a random generator using a combination of the user defined answers and information obtained from the registration circuit 220 and other characters. In some embodiments, the credentials generator generates and distinguishes between uppercase and lowercase letters in a word or phrase. A benefit of generating the credentials in advance is that the user be presented with the credential ahead of time, such that the stimulus may be less specific. Another benefit is that by storing the credentials in a queue, processing is reduced. In some embodiments, the credentials are not stored in advanced (in a queue) and are generated as-needed. A benefit of generating the credentials as needed is increased security as the credentials cannot be viewed ahead of time.

The credentials circuit 222 may generate a plurality of credentials that may remain in a queue. As used herein, a "queue" refers to a list of data items, values, etc., stored/maintained so as to be retrievable in a definite order, usually the order of insertion. The queue may be applied across all of the user's accounts (e.g., one queue for all accounts) or specific to each account (e.g., one queue per account). In the latter configuration, a user may define what types of information are used to generate the credentials in the queue for each account. Such an action may promote providing a vague stimulus because the presumption may be that based on the identity of the account, the user has knowledge of the information database used to generate the credential. For example, if the account is a fitness account, the user may designate "childhood information" as the source of information or generating a credential (e.g., childhood street address, grade school, childhood pet, etc.). Accordingly, the credentials circuit 222 may simply identify the account as fitness account and then provide a stimulus like: "street address and pet." The user may recognize that such information is unique to his/her childhood and readily identify the new credential as the combined childhood street address and childhood pet. Such an activity may avoid having to identify or state "childhood," yet still allow the user to readily identify and recognize the new credential. Still in regard to the latter configuration, in some embodiments, a queue may be created for credentials allowing access to online banking for a financial institution. In another embodiment, a queue may be created for credentials allowing access to a mobile wallet. In yet another embodiment, a queue may be created for personal identification numbers (PIN) for all cards associated with a financial institution. The credentials circuit 222 may store a list of credentials in a queue for a given account. In another embodiment, the credentials circuit 222 may store a single credential for a given account and generate a new credential when the stored credential is deactivated. In some embodiments, the credentials circuit 222 may store a set number of credentials in a queue for an account and once all credentials have been deactivated, the credentials circuit 222 may generate a new queue of credentials. By waiting until the queue is exhausted (e.g., used), the credentials circuit 222 may reduce bandwidth and processing requirements to an as-needed basis. Such actions may promote relatively faster and efficient use of the other circuits included with the financial computing system 142.

The described arrangement allows a user to change a password to a computerized system without going through the process of using a computer to enter new password information. The system is particularly useful in situations where the user does not have immediate access to a full-sized computer keyboard. That is, the system eliminates the need for a keyboard to change the password, while still making the password something that is memorable/meaningful to the user (not just random numbers and letters). This is especially beneficial when the user needs a new password at the point of sale during a transaction. In some embodiments, the user may check in at a merchant location (e.g., via Facebook, the mobile wallet client application 180, etc.) in order to verify the location of the user to generate a new credential during a transaction if a deactivation event is detected.

The detection circuit 224 may be structured to receive information from the financial institution computing system 142 indicative of a detected a deactivation event. As used herein, a "deactivation event" may refer to any event that indicates activity relating to the account indicative of use of the account by a non-authorized used, or the passing of a set amount of time, and the like. For example, a "deactivation event" may be repeated uses of a payment card outside a predefined acceptable use region. In another example, the deactivation event may be a failed transaction. In still another example, the deactivation event may relate to suspected fraudulent activity. The deactivation event may be a transaction in a geographical location not frequented by the user 101, where the detection circuit analyzes a pattern of behavior of the user 101 to determine locations they frequent and are unlikely to or do not frequent. In yet another example, the deactivation event may be a specified event, such as using the credential at a specific location, time, or combination thereof. In yet another example, the deactivation event may be any combination of the aforementioned events. In another example, the deactivation event is the passing of a predetermined amount of time (e.g., three months without a credential change). In some embodiments, when the deactivation event is the passing of a predetermined amount of time, the user receives an alert of the credential change and/or the new credential prior to the deactivation of the current credential (e.g., three days before the current credential is deactivated).

The deactivation/activation circuit 226 manages and may cause at least one of the deactivation and activation of a credential(s) for at least one of a card and an account of the user. The deactivation/activation circuit 226 may deactivate a current credential when the detection circuit 224 detects a deactivation event. As used herein, the terms "deactivate" or "deactivating" relative to the actions and operations of the deactivation/activation circuit 226 may refer to a temporary (e.g., suspended and reactivated credentials) or permanent (e.g., changed credentials) deactivation. The deactivation/activation circuit 224 may activate a new credential for a card and/or financial account in response to deactivation of the previous credential. The new credential activated may be the credential that is next in the queue from the credentials generated by the credentials circuit 222.

The deactivation/activation circuit 226 may provide an indication of the deactivation of the current credential and activation of a new credential information to an authentication system associated with the current credential that is being deactivated, and the new credential being activated. The deactivation/activation circuit 226 may receive information from the authentication system accepting or denying the change in credential. If the credential change is accepted, the deactivation/activation circuit 226 may activate the new credential. Activating and deactivating a credential may follow the same protocol as changing a password for an account. However, by using a credential generated from the credentials circuit 222, the user does not have to create the new credential (e.g., password). In addition, the deactivation/activation circuit 226 automates the credential change process for a given account, so no or little user input is necessary. This may be advantageous if a user needs to change their password to regain access to the account, but is not able to make the necessary changes themselves (e.g., no internet access). If the new credential is not accepted (e.g., too similar to the previous credential), the deactivation/activation circuit 226 may request a second new credential from the credentials circuit 222. The deactivation/activation circuit 226 may send the second new credential to the authentication system associated to ensure the second new credential is acceptable for the financial account or card associated with the changing credentials. The deactivation/activation circuit 226 may send the new credential to a user while they are at a POS where a deactivation event occurred to allow payment to process and the new credential is verified by the financial institution. The deactivated credential may not be used to access the account, or complete a transaction. In some embodiments, when a user attempts to login to the account with a deactivated credential, they will receive an alert reminding the user of the current credential. In another embodiment, access could be varied/limited. For example, the activated credentials gives limited access until the user is in a position to create a more secure password (e.g., with a mobile wallet, the user can make payments up to a temporary threshold and once the new password is created, the temporary threshold is removed).

The card management circuit 228 may manage physical and/or virtual cards associated with the financial institution 140. In one embodiment, if a deactivation event for a credit card is detected by the detection circuit 224, the credit card may be temporarily treated as a debit card by the card management circuit 228. When the credit card is treated as a debit card, a personal identification number (PIN) may be generated and become associated with the credit card by the credentials circuit 222. For example, when the user goes to conduct a transaction with the credit card at a POS, the PIN will be required to complete the transaction, such as is required when completing a transaction with a debit card. The financial institution may still treat the transaction as a (credit) transaction on the users credit card account. The PIN for the credit card may be the credential that is next in the queue of credentials associated with the credit card. If a deactivation event for a debit card is detected by the detection circuit 224, a PIN associated with the debit card may be changed to the credential that is next in the queue of credentials associated with the debit card, or the financial account associated with the debit card. If a deactivation event for a mobile wallet is detected by the detection circuit 224, the password associated with the mobile wallet may be deactivated and a new password may be the next credential in the queue of credentials for the mobile wallet or the financial account associated with the mobile wallet. The card management circuit 228 may create a custom/limited use code (e.g., credit card number, mobile wallet QR code, etc.). This may be done using a random number generator to create the number. The randomly generated number may be linked to the compromised account. The custom/limited use code may be configured so it is only valid until the user 101 receives a replacement card from the financial institution 140. The limited use code may deactivate or be deleted once a new card number is linked with the account. In another embodiment, the limited use code may need input from the user to be deactivated or deleted. The card management circuit 228 may order a new or replacement card (e.g., credit, debit, etc.) from the financial institution 140. The card management circuit 228 may cause a new 3D printed card to be created (e.g., from an on demand card printer at a bank, etc.). The user may have to select the location where the printing will occur. The user may also have to approve the printing of the card once they arrive at the selected location. The card management circuit 228 may verify the user is at the location by receiving the location of the user device from the location circuit 212. The card management circuit 228 may be communicably coupled to the location circuit 232. The card management circuit 228 may manage cards based on information received from the location circuit 232, which is discussed further with respect to the location circuit 232.

The alert circuit 230 may alert the user 101 of a change in credentials. The user 101 may define when, how, and what information they may receive in an alert via the registration circuit 220. The alert circuit 230 may send an alert when the detection circuit 224 detects a deactivation event. The alert circuit 230 may send an alert when a credential is deactivated, when a new credential is activated, or for other information pertaining to the changing of credentials. The alert may include the name of the account or card that had a deactivation event detected, the credentials, or a stimulus of the credentials, that are being deactivated, and/or an identification of the new credential or a stimulus therefor. The information indicating the new credential may be which credential is being activated (e.g., referencing a credential in the queue where the user 101 has access to the queue of credentials), an indication of which user-provided information is being used to generate the new credential—that is to say, a stimulus (e.g., [mother's maiden name][elementary school]), the case for the given words or phrases (e.g., [mother's maiden name, first letter capital][elementary school, all caps]), and/or other characters added to the credential (e.g., [mother's maiden name]@[elementary school]!). The information indicating the new credential may be based on the user preferences defined by the registration circuit 220. The information indicating the new credential may be based on the credentials that are generated by the credentials circuit 222.

The alert may be provided via any type of transmission method. In this regard, the alert may be provided as a text message, an email, and/or a notification to the user device 110. The alert may be sent to the primary account holder and/or other users associated with the account. The alert could be sent via a different channel that the one currently trying to be accessed. All such variations are intended to fall within the scope of the present disclosure.

The location circuit 232 may allow the user 101 to set up location preferences. The location circuit 232 may have the same or similar structure and function as location circuit 212. Additionally, the location 232 may cause the same or similar operations to occur as location circuit 212. For example, the location circuit 232 may allow a user 101 to enter travel plans (e.g., in Spain from May $1^{st}$ to May $5^{th}$, in Germany from May $5^{th}$ to May $8^{th}$, etc.). The location circuit 232 may recognize when a user 101 is in a certain geographical location (e.g., the locations specified in the travel plans). When the user 101 is in a specified geographical area during travel, the use of a specified card number or financial account with a certain queued credential may be limited to the specified geographical area. The specified geographical area may be a large geographical area (e.g., California, etc.), a focused geographical area (e.g., San Francisco, etc.), or a point location (e.g., a specific address, etc.). Additionally, the geographical area may be a group of areas and/or point locations (e.g., San Francisco and Silicon Valley, etc.). The location circuit 232 may cause the card management circuit 228 to create a temporary card number for use during travel. The location circuit 232 may cause the card management circuit 228 to create one or more one-time transaction numbers. The location preferences may be used by the detection circuit 224 and deactivation/activation circuit 226 to define and determine when a deactivation event is encountered. For example, the location circuit 232 may cause a deactivation event based on a determined geographical location of a transaction responsive to a comparison of a predefined acceptable location for the transaction.

The security circuit 234 may provide additional security when a deactivation event is detected. In one embodiment, the security circuit 234 may provide additional security when two or more deactivation events are detected. In other embodiments, the additional security may be provided based on any number of detected deactivation events. The security circuit 234 may be communicably coupled to the location circuit 212 of the user device 110. The security circuit 234 may also be communicably coupled to the detection circuit 224. In some embodiments, the security circuit 234 is communicably coupled to the location circuit 232. In another embodiment, the security circuit 234 is communicably coupled with the alert circuit 230. When a deactivation event is detected (e.g., by the detection circuit 224), the security circuit 234 may generate a plurality of security questions. In some embodiments, the security circuit 234 generates questions with a yes or no answer. In another embodiment, the security circuit 234 generates questions based on information obtained from the location circuit 212. In some embodiments, the security circuit 234 generates security questions based on the location circuit 232. In another embodiment, the security circuit 234 generates security questions based on other information obtained from the user device 110 (e.g., location information, user device usage information). The security questions may be based on information for which only the user 101 should know the answer. The security circuit 234 may prompt the user 101 to answer the security questions generated. In some embodiments, the security circuit 234 may provide the questions to the alert circuit 230. The alert circuit 230 may then alert the user 101, via the user device 110, to answer the questions.

In another embodiment, the security circuit 234 may send the security questions directly to the user device 110 for the user 101 to answer. The security circuit 234 may determine if the security questions were answered correctly. In some embodiments, the original credential may be reactivated if enough questions are answered correctly. In an alternative embodiment, a new credential is activated if enough questions are answered correctly. In some embodiments, the user 101 must answer all questions correctly to reactivate the credentials. In another embodiment, the user 101 needs to answer a certain percent of questions correctly to reactivate the credentials. In some embodiments, there is a limited time span that the user must answer the questions (e.g., if the questions are generated while the user is at a POS, the user must answer the questions within a certain number of minutes or the credentials will remain deactivated). In some embodiments, if not enough questions are answered correctly, the credentials will remain deactivated. The user 101 may have to contact the financial institution 140 to reactivate the credentials.

Figure 3:
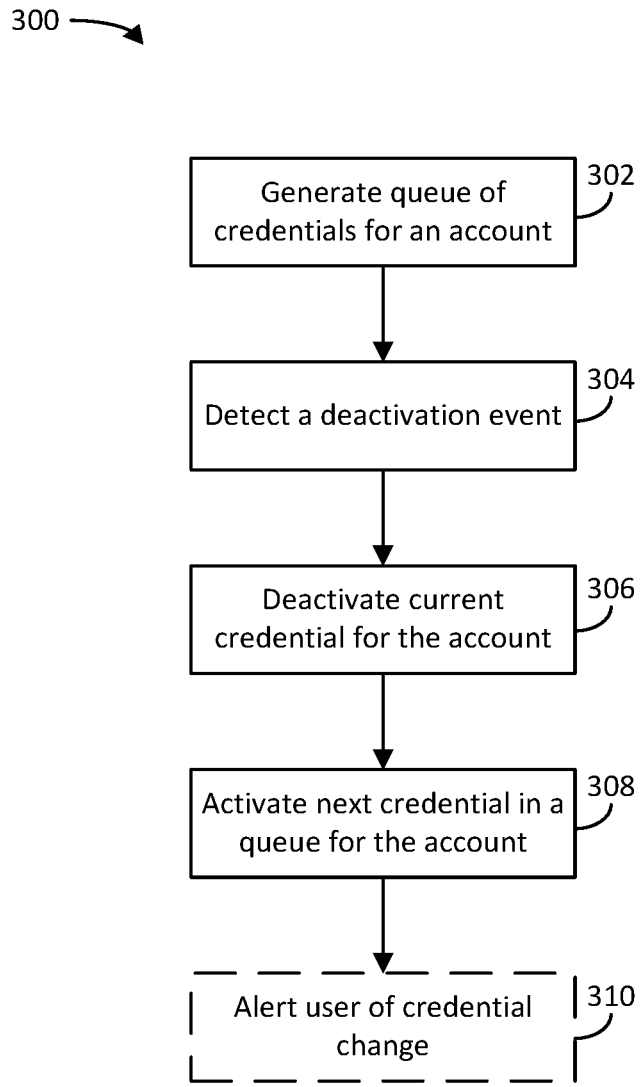
FIG. 3 is a flow diagram of a method of changing credentials, according to an example embodiment.

Now referring to FIG. 3, a flow diagram of a method 300 of changing credentials is shown, according to an exemplary embodiment. Method 300 includes operation 302, generate a queue of credentials, operation 304, detect a deactivation event, operation 306, deactivate current credential for account, operation 308, activate next credential in queue for account, and operation 310, alert user of credential change.

At operation 302, a queue of credentials for an account is generated. Operation 302 may be performed by registration circuit 220 in combination with the credentials circuit 222. The queue of credentials may be generated for one or more accounts, such as one or more financial accounts. The queue of credentials may be generated for one or more cards, physical or virtual, associated with a financial account. As mentioned above, the credentials generated may be a listing of passwords, generated using user defined answers and information obtained from a user, and so on. For example, a user may answer a variety of pre-set questions relating to personal information (e.g., mother's maiden name, birthday, first pet, elementary school, etc.), wherein the answers to the pre-set questions are used to generate a new credential that is stored in the queue. In this regard, the user may not actually define/determine the new credential. In another embodiment, the user may create their own questions/ categories and provide the accompanying answers. As also mentioned above, in one embodiment, a queue may be created for each individual account. In yet another embodiment, a queue may be created for all accounts. In still another embodiment, financial accounts and the cards associated with the financial account may have separate queues. In some embodiments, the credentials may be stored as a set number of credentials in a queue for an account and once all credentials have been deactivated, a new queue of credentials may be generated.

At operation 304, a deactivation event is detected. Operation 304 may be performed by detection circuit 224. As mentioned above, the deactivation event may include any one or more of the detection of a failed transaction, suspected fraudulent activity, a transaction in a geographical location not frequented by the user, the passing of a set amount of time, or any combination of the aforementioned events. The detection of a deactivation event may use information from a financial computing system 142 to determine if an event is a deactivation event. As an example, a transaction that is inconsistent with past transaction patterns. In another embodiment, the detection of a deactivation event may rely on different settings for determining if an event qualifies as a deactivation event. As an example, an abundance of activity occurring close together on an account that is used sparingly. Deactivation events may be caused by using physical cards at a brick and mortar location. As an example, a failed transaction may be due to an inaccurate PIN being entered. In some embodiments, deactivation events may be caused by using a physical card for virtual transactions (e.g., online purchases). For example, an online purchase using a debit on a website that is determined to be an untrusted site. In another embodiment, the deactivation events may be detected for virtual cards (e.g., a QR code for a virtual wallet associated with a financial account) for physical and/or virtual transactions. For example, a failed transaction of a virtual card due to an incorrect password being entered for the mobile wallet account. In another example, the deactivation event is the passing of a predetermined amount of time (e.g., three months without a credential change).

At operation 306, in response to detection of a deactivation event, a current credential for the account or card is deactivated. Operation 306 may be performed by deactivation/activation circuit 226.

At operation 308, a new credential for the account is activated. Operation 308 may be performed by deactivation/activation circuit 226. The new credential activated may be the credential that is next in the queue from the credentials generated at operation 302. The credential deactivated at operation 306 and the credential activated at operation 308 may be provided to an authentication system associated with the financial account or card associated with the deactivation event detected. The authentication system may accept or deny the change in credential. If the credential change is accepted, the new credential may be activated (operation 308). If the new credential is not accepted (e.g., too similar to a previous credential entered by the user), a second new credential may be selected for activation. The second new credential may be sent to the authentication system associated with the financial account or account to ensure the second new credential is acceptable for the financial account or card associated with the changing credentials. The deactivated credential may not be used to access the account, or complete a transaction. In some embodiments, when a user attempts to login to the account with a deactivated credential, they will receive an alert reminding the user of the current credential (e.g., a text message, an email, etc.).

At operation 310, the user is alerted of a change in credentials. This operation may vary based on user preferences. Operation 310 may be performed by alert circuit 230. As mentioned above, the user may define when, how, and what information they will receive in an alert. Accordingly, the "alert" may include the same or similar structure and configuration as described herein above (e.g., the alert may include a stimulus, an identification of the account associated with the deactivated credential, etc.).

Figure 4:
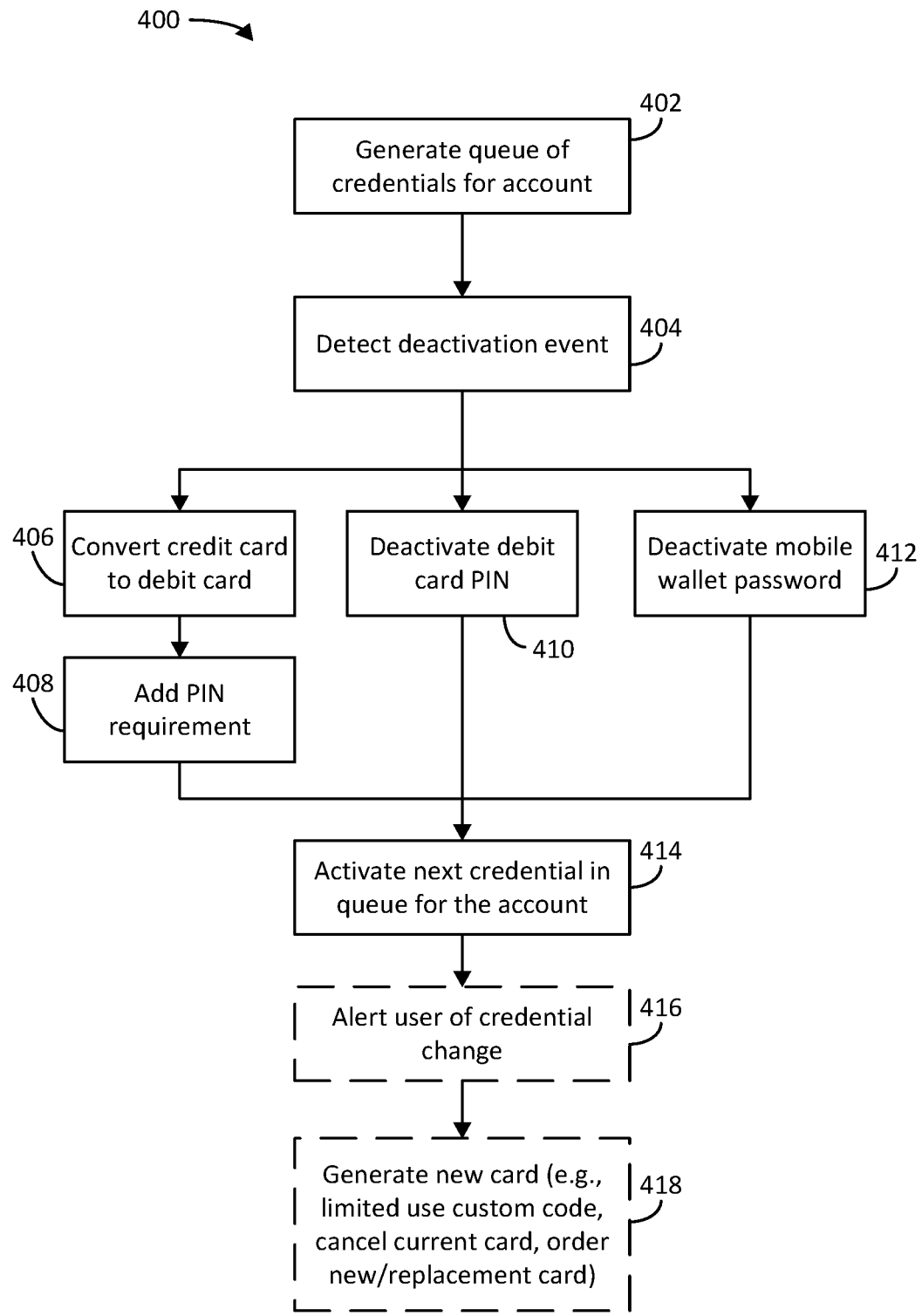
FIG. 4 is a flow diagram of a method of managing cards associated with the financial account, according to an example embodiment.

Referring now to FIG. 4, a flow diagram of a method 400 of managing cards associated with the financial account of FIGS. 1-2, is shown, according to an exemplary embodiment. As used herein, a "card" may refer to a physical or a manifestation of a card in a mobile wallet, etc. associated with an account. Method 400 includes operation 402, generate queue of credentials, operation 404, detect deactivation event, operation 406 convert credit card to debit card, operation 408, add PIN requirement to converted debit card, operation 410, deactivate debit card PIN, operation 412, deactivate mobile wallet password, operation 414, activate next credential in queue for account, operation 416, alert user of credential change, and operation 418, generate new card creation.

At operation 402, a queue of credentials for an account is generated. In this example, the account is a financial account. However, as will be appreciated by those of ordinary skill in the art, the account may include any type of account that uses a credential (e.g., a health records account, etc.). Operations 402-404 may be substantially similar to operations 302-304 of method 300.

Operations 406-412 relate to managing of a card or cards associated with a financial account, when the card(s) or financial account and have been compromised. Operations 406-412 may be performed by card management circuit 228. Operations 406-412 may be selectively performed based on the configuration of the queued credentials circuit 154 (e.g., a user may not have a mobile wallet, such that operation 412 is excluded). Accordingly, at operation 406, a credit card associated with a detected deactivation event is temporarily treated as a debit card. When the credit card is treated as a debit card, a personal identification number (PIN) may be generated and become associated with the credit card (operation 408). For example, when the user goes to conduct a transaction with the credit card at a POS, the PIN will be required to complete the transaction, such as is required when completing a transaction with a debit card. The financial institution will still treat the transaction as a (credit) transaction on the users credit card account. The PIN may be the credential that is next in the queue of credentials associated with either the credit card, or the financial account associated with the credit card. In comparison, at operation 410, the current credential (e.g., a PIN) for a debit card associated with the deactivation event is deactivated. In some embodiments, an accompanying mobile wallet may also experience a change in credentials. And, at operation 412, the password associated with a mobile wallet associated with a deactivation event is deactivated. Only cards linked to the account that has a deactivation event detected will become deactivated. For example, if two users (e.g., spouses) each have a debit card linked to a common account, and a deactivated event is detected, both of the debit cards will have a current PIN deactivated.

At operation 414, the next credential in queue is activated. According to one embodiment, the next credential is activated for all of the aforementioned cards that have been deactivated. According to another embodiment, the next credential may be activated for only a subset of selected cards. The PIN associated with the debit card may be changed to the credential that is next in the queue of credentials associated with the debit card, or the financial account associated with the debit card. The password associated with the mobile wallet may be deactivated and a new password is the next credential in the queue of credentials. At operation 416, the user is alerted of a credential change. Operation 416 may be substantially similar to operation 310 of method 300.

At operation 418, a new card is generated or caused to be generated. Operation 418 may be performed by card management circuit 228. In one embodiment, a custom/limited use code (e.g., credit card number, mobile wallet QR code, etc.) may be generated. The custom/limited use code may be configured so that it is only valid until the user receives a replacement card from a financial institution. Operation 418 may further include ordering a new or replacement card (e.g., credit, debit, etc.) from the financial institution. A new 3D printed card may be created (e.g., from an on demand card printer at a branch location, etc.).

Figure 5:
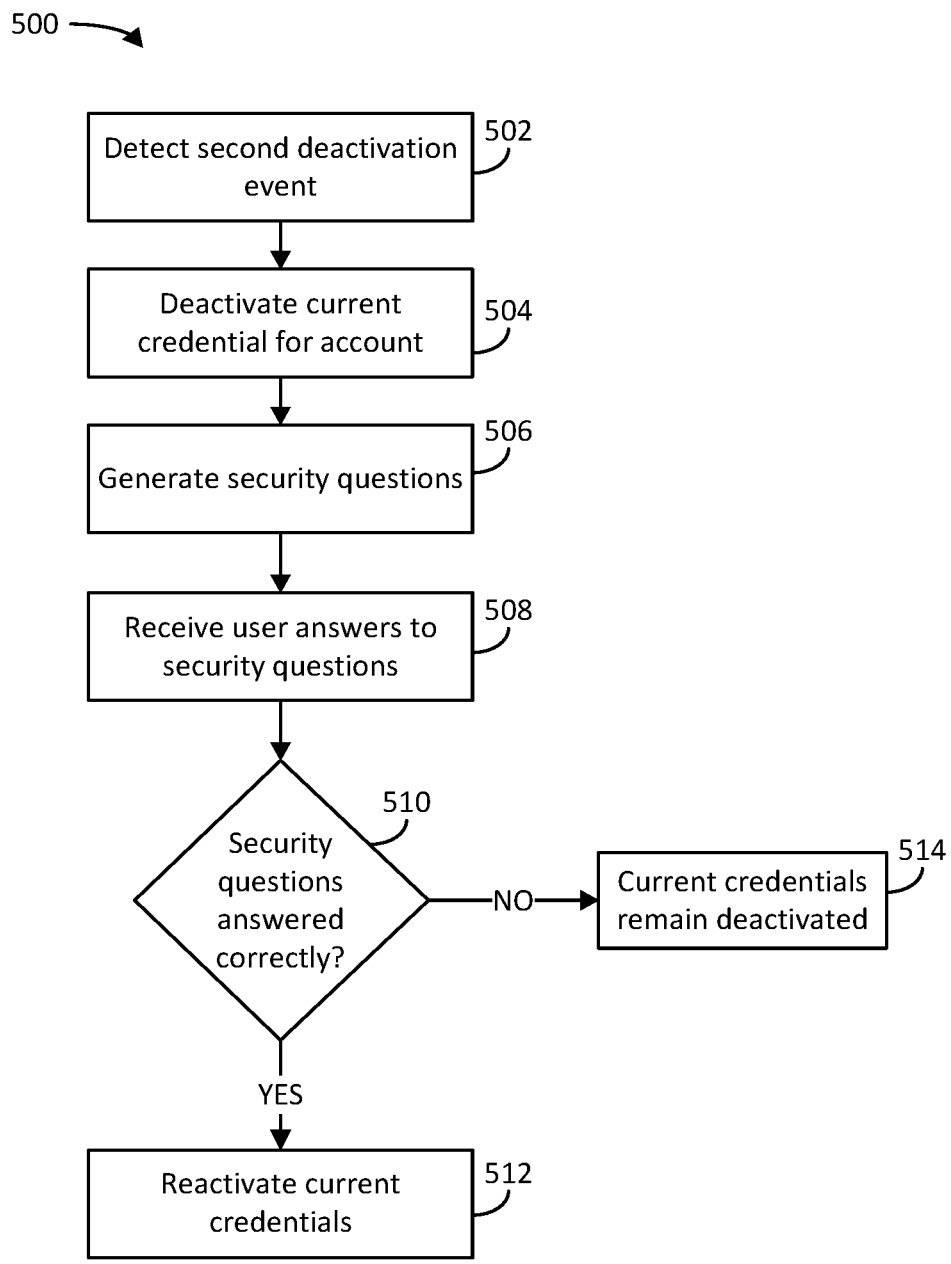
FIG. 5 is a flow diagram of a method of providing additional security for credentials of an account, according to an example embodiment.

Referring now to FIG. 5, a flow diagram of a method 500 of providing additional security for credentials of the financial account are shown, according to an exemplary embodiment. In one embodiment, method 500 may occur after method 300 and after method 400. In some embodiments, method 500 may occur after a combination of the operations of methods 300 and 400. Method 500 includes operation 502, detect a second deactivation event, operation 504, deactivate current credential for an account, operation 506, generate security questions, operation 510, determine if the questions are answered correctly, operation 512, reactivate current credentials or activate a new credential, and operation 514, current credentials remain deactivated.

At operation 502, a second deactivation event for the same financial account or card is detected. Operation 502 may be performed by detection circuit 224. The deactivation event may be a failed transaction. The deactivation event may be suspected fraudulent activity. The deactivation event may be a transaction in a geographical location unfrequented by the user. The deactivation event may be a specified location. The deactivation event may be a combination of the aforementioned events. The first and second deactivation events may be caused by the same type of event. The first and second deactivation events may be caused by different types of events. In some embodiments, the first and second deactivation events may have to occur within a specified amount of time to cause the second deactivation event to be considered the second deactivation event. If the specified amount of time has passed, the "second" deactivation event would be considered a first deactivation event.

At operation 504, the current credential is deactivated for the card or financial account that had a second deactivation event occur. The current credential may be the credential that was activated when the first deactivation event occurred. Operation 504 may be performed by deactivation/activation circuit 226.

At operation 506, security questions are generated. Operation 506 may be performed by the security circuit 234. A plurality of security questions may be generated. In some embodiments, the security questions are a yes or no question. In another embodiment, the security questions are based on location information (e.g., the location circuit 212, the location circuit 232). In another embodiment, the security questions are based on other information obtained from a user device (e.g., user device 110). The security questions may be based on information for which only a user (e.g., user 101) should know the answer. At operation 508, the user answers the security questions generated. The user may receive an alert to answer the security questions. In some embodiments, the user can answer the security questions from the user device.

At operation 510, the security questions are determined to be answered correctly or incorrectly. In some embodiments, the user must answer all questions correctly. In another embodiment, the user needs to answer a certain percent of questions correctly. If it is determined that enough questions are answered correctly, operation 512 may occur. If it is determined that not enough questions are answered correctly, operation 514 may occur.

At operation 512, the current credential is reactivated for the account or card associated with the deactivation event. In another embodiment, at operation 512, a new credential (e.g., the second credential in the queue of credentials) is activated. Operation 512 may be performed by deactivation/activation circuit 226. The new credential to be activated may be the credential that is next in a queue of credentials. The credential deactivated by operation 504 and the credential activated by operation 512 may be provided to an authentication system associated with the financial account or card that had the deactivation event detected. The authentication system may accept or deny the change in credential. If the credential change is accepted, the new credential may be activated. If the new credential is not accepted (e.g., too similar to the previous credential), a second new credential may be selected for activation. The second new credential may be sent to the authentication system associated with the financial account or account to ensure the second new credential is acceptable for the financial account or card associated with the changing credentials. The deactivated credential may not be used to access the account, or spend money.

At operation 514, the credentials may remain deactivated. The user may have to contact the financial institution to reactivate the credentials, or activate a new credential.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g, flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
maintaining, by one or more processors, a credential queue comprising a first credential configured to grant access to an account;
providing, by the one or more processors, a queued credentials interface comprising (i) one or more pre-set questions and (ii) one or more location queries requesting one or more deactivation locations;
generating, by the one or more processors, using one or more responses to the one or more pre-set questions in the queued credentials interface, a second credential granting access to the account;
storing, by the one or more processors, the second credential in the credential queue;
detecting, by the one or more processors, a use of the first credential in a transaction attempt corresponding to a transaction;
receiving, by the one or more processors, from a GPS sensor of a device, latitude data and longitude data during the transaction attempt;
determining, by the one or more processors, based on the latitude data and the longitude data, a location of the device during the transaction;
detecting, by the one or more processors, a deactivation event relating to the use of the first credential by determining that the location is one of the one or more deactivation locations received via the queued credentials interface;
deactivating, by the one or more processors, responsive to detecting the deactivation event, the first credential in the credential queue;

responsive to deactivating the first credential, activating, by the one or more processors, the second credential stored in the credential queue;

transmitting, by the one or more processors, responsive to activating the second credential, an alert comprising a stimulus for the second credential, the stimulus corresponding to the one or more pre-set questions, wherein activating the second credential is responsive to the device checking in at a merchant location;

receiving, by the one or more processors, the second credential responsive to the alert; and responsive to receiving the second credential, completing, by the one or more processors, the transaction.

2. The method of claim 1, further comprising configuring, by the one or more processors, the second credential for storage in or more data structures in a memory of the device.

3. The method of claim 1, further comprising restricting, using information provided by the device prior to the deactivation event, the second credential responsive to a request.

4. The method of claim 1, further comprising:

sending, by the one or more processors, a message to an entity associated with the account, wherein the message is to create a first account card for the account.

5. The method of claim 4, further comprising creating, by the one or more processors, the first account card for the account from at least one of a temporary card and a printed card.

6. The method of claim 1, wherein the first and second credentials are personal identification numbers, the method further comprising:

receiving, by the one or more processors, from a credit card, a personal identification number associated with the second credential of the account; and completing, by the one or more processors, on the credit card, the transaction responsive to the personal identification number.

7. The method of claim 1, further comprising deactivating, by the one or more processors, the second credential responsive to a second merchant location matching one of the one or more deactivation locations.

8. A device comprising:

one or more processors coupled to memory and configured by machine-readable instructions to:

maintain a credential queue comprising a first credential configured to grant access to the account;

provide a queued credentials interface comprising (i) one or more pre-set questions and (ii) one or more location queries requesting one or more deactivation locations;

generate, using one or more responses to the one or more pre-set questions in the queued credentials interface, a second credential that grants access to the account;

store the second credential in the credential queue;

detect a use of the first credential in a transaction attempt corresponding to a transaction;

receive, from a GPS sensor of a device, latitude data and longitude data during the transaction attempt;

determine, based on the latitude data and the longitude data, a location of the device during the transaction;

detect a deactivation event relating to the use of the first credential by determining that the location is one of the one or more deactivation locations received via the queued credentials interface;

responsive to the deactivation event, deactivate the first credential for the account, the first credential in the credential queue;

responsive to deactivating the first credential, activate the second credential stored in the credential queue;

transmit, responsive to activating the second credential, an alert comprising a stimulus for the second credential, the stimulus corresponding to the one or more pre-set questions;

receive the second credential responsive to the alert; and responsive to receiving the second credential, complete the transaction;

wherein the one or more processors are further configured by machine-readable instructions to activate the second credential responsive to locating the device at a merchant location.

9. The device of claim 8, wherein the second credential is configured for storage in one or more data structures of the device.

10. The device of claim 8, wherein the second credential is generated responsive to a request.

11. The device of claim 8, wherein the one or more processors are further configured to create a second account card for the account.

12. The device of claim 8, wherein the first and second credentials are personal identification numbers, and wherein the one or more processors are further configured to:

receive, from a credit card, a personal identification number associated with the second credential for the account; and complete, on the credit card, the transaction responsive to the personal identification number.

\* \* \* \* \*